(12) United States Patent
Kim

(10) Patent No.: US 7,945,925 B2
(45) Date of Patent: May 17, 2011

(54) COPY PROTECTION

(75) Inventor: In Moon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 631 days.

(21) Appl. No.: 11/727,183

(22) Filed: Mar. 23, 2007

(65) Prior Publication Data

US 2007/0245370 A1    Oct. 18, 2007

(30) Foreign Application Priority Data

Mar. 24, 2006  (KR) .................. 10-2006-0027064

(51) Int. Cl.
*H04N 7/16* (2006.01)
*H04N 7/167* (2006.01)

(52) U.S. Cl. .............................. 725/31; 725/25; 380/225
(58) Field of Classification Search ..................... 725/31
See application file for complete search history.

(56) References Cited

U.S. PATENT DOCUMENTS

| | | | |
|---|---|---|---|
| 6,970,564 B1 * | 11/2005 | Kubota et al. ................. | 380/210 |
| 6,981,272 B1 * | 12/2005 | Morinaga et al. .............. | 725/25 |
| 7,540,008 B2 * | 5/2009 | Smith ............................ | 725/25 |
| 7,715,557 B2 * | 5/2010 | Duval ........................... | 380/200 |

* cited by examiner

*Primary Examiner* — Dominic D Saltarelli
(74) *Attorney, Agent, or Firm* — McKenna Long & Aldridge LLP

(57) ABSTRACT

An apparatus for copy protection in a cable broadcast receiver and method thereof, by which digital broadcast contents can be protected from being copied.

12 Claims, 6 Drawing Sheets

FIG. 3
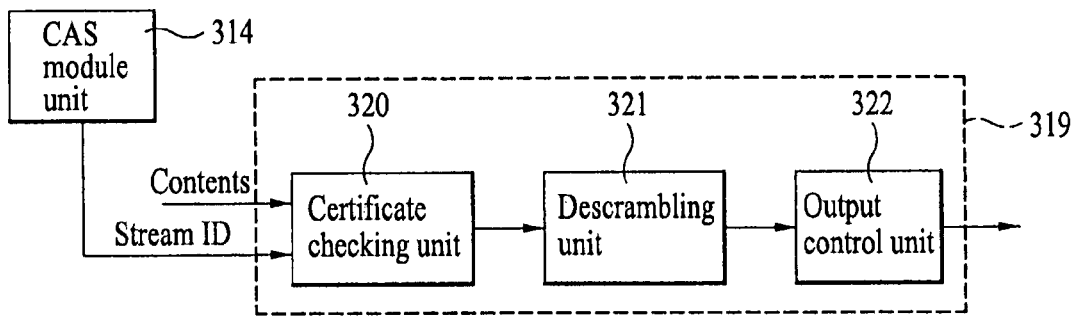
FIG. 4
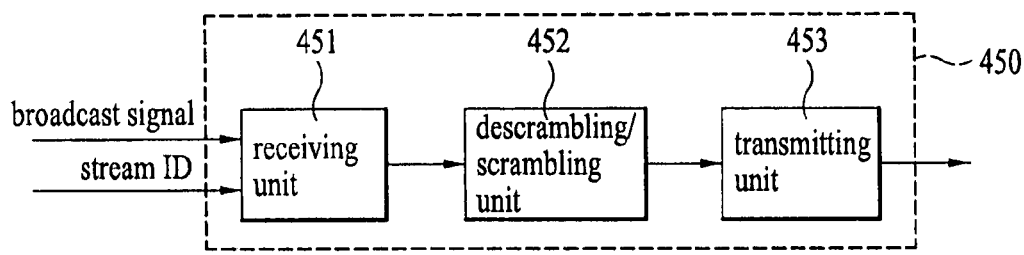
FIG. 5
| CCI Bits # | 7 | 6 | 5 | 4 | 3 | 2 | 1 | 0 |
|---|---|---|---|---|---|---|---|---|
| Card sets to | 0 | 0 | 0 | CIT | APS1 | APS0 | EMI1 | EMI0 |
| Host interprets as | rsvd | rsvd | rsvd | CIT | APS1 | APS0 | EMI1 | EMI0 |

FIG. 6

| EMI Value | Digital Copy Permission |
|---|---|
| 00b | Copying not restricted |
| 01b | No further copying is permitted |
| 10b | One generation copy is permitted |
| 11b | Copying is prohibited |

FIG. 7

| APS | Description |
|---|---|
| 00b | Copy Protection Encoding Off |
| 01b | AGC Process On. Split Burst Off |
| 10b | AGC Process On. 2 Line Split Burst On |
| 11b | AGC Process On. 4 Line Split Burst On |

FIG. 8

| APS | Description |
|-----|-------------|
| 0b | No Image Constraint asserted |
| 1b | Image Constraint required |

FIG. 9

| TS | 1 | 2 | 3 | 4 | 5 | 6 |
|----|---|---|---|---|---|---|
| Stream ID | 1 | 2 | 3 | 4 | 5 | 6 |
| CCI | CCI_1 | CCI_2 | CCI_3 | CCI_4 | CCI_5 | CCI_6 |

COPY PROTECTION

This application claims the benefit of the Korean Patent Application No. 10-2006-0027064, filed on Mar. 24, 2006, which is hereby incorporated by reference as if fully set forth herein.

BACKGROUND

1. Field

The present disclosure relates to a copy protection of a broadcast signal received as multi-streams.

2. Discussion of the Related Art

Generally, digital broadcasting is a generic term of digitally transmitted broadcasts. U.S.A. has decided to adopt a digital system for a next generation television called ATV (advanced television). And, many projects including HD DIVINE of Sweden, SPECTRE of U.K., DIAMOND of France, and the like have been actively in progress in E.U as well. Moreover, many efforts have been globally made to research and develop the digital broadcasting as a next generation system interoperating with B-ISDN or computer networks.

As broadcast contents are digitalized and transmitted, protection of the broadcast contents becomes a very important matter. To protect digital broadcast contents in a digital broadcast receiver, a copy protection device and/or a reception restricting device enabling an authorized user to view the digital broadcast contents is needed.

Meanwhile, a cable broadcast system mainly consists of a cable broadcasting station transmitting cable broadcasts and a cable broadcast receiver receiving the transmitted cable broadcasts. In particular, the cable broadcasting station is called an SO headend or an MSO headend. In this case, the SO (system operator) is a total wire broadcasting service provider, i.e., a local cable TV broadcasting service provider and the MSO (multiple system operator) includes several system operators.

The cable broadcasting provides various kinds of information to a specific user who has paid the corresponding charge. Yet, various kinds of information may be provided to an unauthorized user who has not paid the corresponding charge via hacking or the like. To solve this problem, the cable broadcast receiver includes a security module capable of a security function.

However, in case that broadcast signal streams between a broadcasting station, a cable card, and a host are multi-streams, it is difficult to control an output to which copy protection is applied per stream.

SUMMARY

According to one general implementation, A method of copy protection in a cable broadcast receiver, includes the steps of receiving a multi-stream broadcast signal, assigning a unique stream identifier to each stream of the multi-stream broadcast signal, receiving copy control information to which the stream identifier is assigned, matching the stream and the copy control information using the stream identifier, storing the matched copy control information and controlling an output of a broadcast stream using a value of the stored copy control information.

According to another general implementation, a cable broadcast receiver, which receives a multi-stream broadcast signal, includes a broadcast receiving unit receiving a multi-stream broadcast signal, a CAS module unit assigning a unique stream identifier to each stream of the received multi-stream broadcast signal and a control unit controlling copy control information matched to the stream identifier assigned to the stream to be stored, the control unit controlling an output of a broadcast stream using a value of the stored copy control information.

According to another general implementation, a copy protection system receiving a multi-stream broadcast signal, comprises a host receiving the multi-stream broadcast signal, the host assigning a unique stream identifier to a header of a received multi-stream per stream and a cable card receiving the multi-stream to which the stream identifier is assigned from the host, the cable card storing header information of the stream, the cable card assigning the stored header information to copy control information, the cable card conveying the copy control information to the host, wherein the host stores the copy control information and the stream to which the same stream identifier is assigned and then controls an output of the stream using the copy control information matched to the stream identifier.

The details of one or more implementations of [title] are set forth in the accompanying drawings and the description below. Other features will be apparent from the description and drawings, and from the claims.

BRIEF DESCRIPTION OF THE DRAWINGS

The accompanying drawings, which are included to provide a further understanding of the implementations and are incorporated in and constitute a part of this disclosure, illustrate implementations and together with the description serve to explain the implementations. In the drawings:

FIG. 3 is a detailed block diagram of a multi-stream copy protection apparatus of a host according to one general implementation;

FIG. 4 is a detailed block diagram of the multi-stream copy protection apparatus of the cable card according to one general implementation;

FIG. 5 is a diagram of meanings of copy control information assigned to each bit;

FIG. 6 is a diagram of copy permissions associated with EMI values;

FIG. 7 is a diagram of definitions of APS values;

FIG. 8 is a diagram of definitions of CIT values;

FIG. 9 is a diagram of a matching table between copy control information and broadcast signal streams.

DETAILED DESCRIPTION

Reference will now be made in detail to the implementations, examples of which are illustrated in the accompanying drawings. Wherever possible, the same reference numbers will be used throughout the drawings to refer to the same or like parts.

Latest open cable specifications extend a conventional single-stream cable card system to support a multi-stream cable card system.

In case of a single stream, there is only one transport stream (TS) a host can use. For an output control for the single stream, a value transmitted by a cable card is applied intact.

Yet, in case of multi-streams, a host can use maximum six different streams. And, a cable card can send maximum six different copy control informations (CCI) for the six different streams, respectively. In this case, since each of the streams has its copy control information, the correct copy control information matching the corresponding stream should be used to control outputs of the respective streams.

In particular, it is able to match a stream and a CCI using ECM PID included in a stream. Yet, in case of outputting multi-streams multiply, it is unable to correctly perform a copy control. This is because a most recently received CCI may be erroneously applied to the whole multi-streams.

Figure 1:
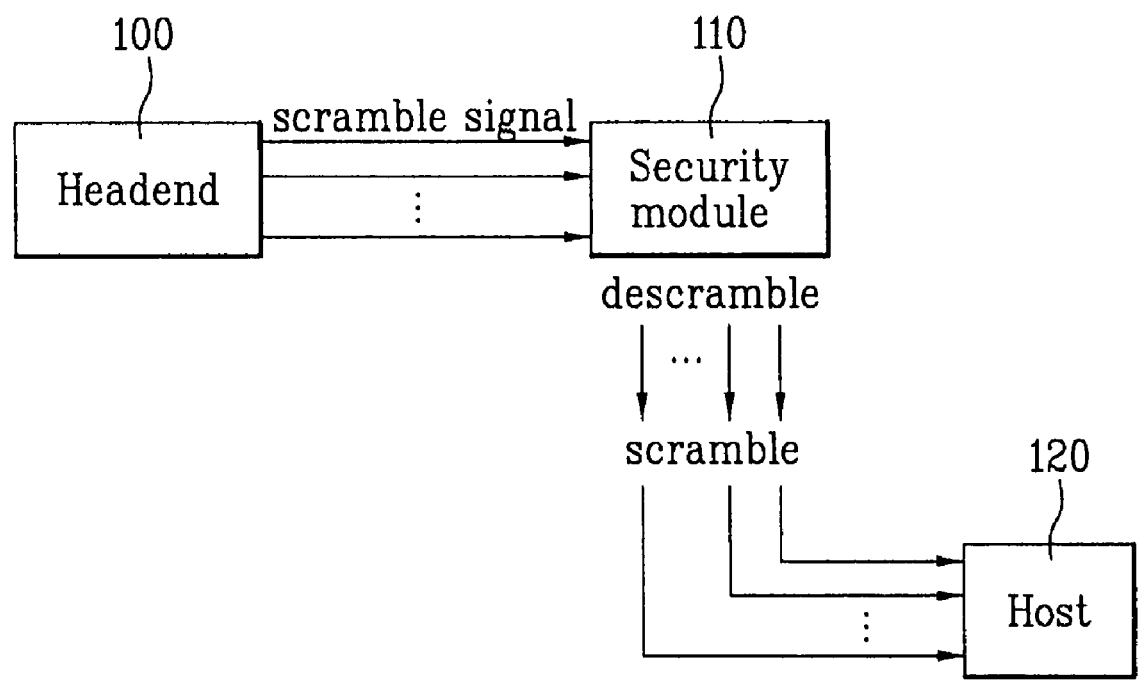
FIG. 1 is a block diagram of a multi-stream copy protection system according to one general implementation.

FIG. 1 is a block diagram of a multi-stream copy protection system.

Referring to FIG. 1, a copy protection system includes a headend 100, a security module 110, and a host 120.

The headend 110 indicates a broadcasting station that transmits a broadcast signal to a broadcast receiver. The headend 100 includes an SO headend or an MSO headend. In this case, the SO (system operator) is a total wire broadcasting service provider, i.e., a local cable TV broadcasting service provider and the MSO (multiple system operator) includes several system operators.

The security module 110 means a module including a conditional access (CA) system. As one implementation of the security module 110, there exists an open cable system separated from a main body. In this case, a broadcast signal from the broadcasting station is provided to a user by being descrambled via a descrambling module of a cable card.

Alternatively, instead of being included in the cable card, the security module 110 can be downloaded as software from the broadcasting station or the like to be stored in the host 120. In this case, a descrambling module is provided within the host without a cable card and the descrambling module is configured by being downloaded from the broadcasting station or the like. In particular, the descrambling module downloaded from the broadcasting station or the like can be configured to be stored in a prescribed memory within the host.

In an exemplary method of downloading the descrambling module, if a security processor loaded in a set-top box accesses a network, a CA (conditional access) image is automatically downloaded from a headend. Thus, a system for downloading a security module is called DCAS (download CAS). Alternatively, both of the cable card and the DCAS are provided to be selectively used.

It is apparent that the configurational difference does not put limitation on the scope of the appended claims and their equivalents. Yet, in the following description, it is assumed that a descrambling module is provided to a cable card detachably loaded in a host.

The broadcasting station 100 scrambles a broadcast signal to prevent on-line hacking and the like and then transmits the scrambled broadcast signal. And, the cable card descrambles the received broadcast signal. The signal descrambled by the cable card is re-scrambled for a conditional access between the cable card and the host 120.

Finally, the host 120 descrambles the broadcast signal received via the cable card 110 and then displays the conditionally accessed broadcast signal.

Figure 2:
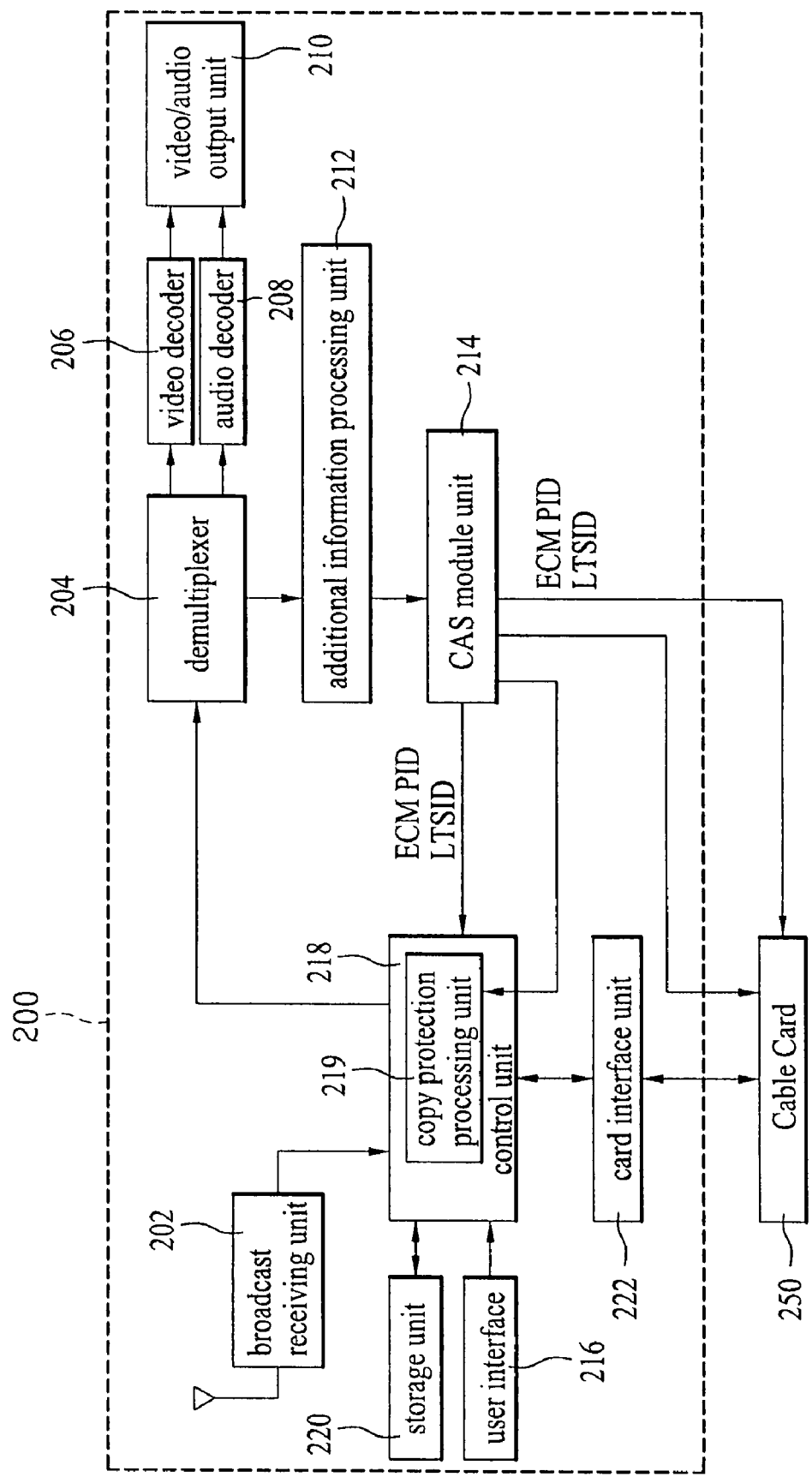
FIG. 2 is a block diagram of an exemplary digital broadcast.

FIG. 2 is a block diagram of a digital broadcast receiver capable of conditional access by controlling each of multi-streams of a received broadcast signal according to one general implementation.

Referring to FIG. 1 and FIG. 2, a host 200 receives a multi-stream broadcast signal transmitted by the headend 100. The received multi-stream broadcast signal is transferred to a cable card 250. The cable card 250 performs conditional access processing on the corresponding broadcast signal and then transfers the processed broadcast signal back to the host 200. Hence, a user is able to view the corresponding broadcast.

In particular, the multi-stream broadcast signal transmitted by the broadcasting station is tuned by a broadcast receiving unit 202 of the host 200. To prepare for the case of receiving the multi-stream broadcast signal from the broadcasting station, the host 200 includes a CAS (conditional access system) module unit 214 assigning a unique stream identifier for discriminating each stream.

The stream identifier assigned by the CAS module unit 214 is given to a broadcast signal stream, a scramble key, a descramble key, and copy control information. As the stream identifier is given to each of the streams, scrambling/descrambling and broadcast signal output control are matched for each of the streams to avoid error occurrences.

Broadcast signal processing is explained with reference to FIG. 2 as follows.

First of all, a digital broadcast receiver includes the host 200 and the cable card 250.

The host 200 includes a broadcast receiving unit 202, a demultiplexer 204, an audio decoder 206, a video decoder 208, an audio/video output unit 210, an additional information processing unit 212, a CAS (conditional access system) module 214, a user interface 216, a control unit 218, a copy protection processing unit 219, a storage unit 220, and a card interface unit 222.

In particular, the broadcast receiving unit 202 tunes a channel selected by a user.

The demultiplexer 204 demultiplexes a time-multiplexed transport stream into a video signal, an audio signal, and an additional information signal.

The audio decoder 206 extends/reconstructs the audio signal separated by the demultiplexer 204 to be outputted through a speaker. And, the video decoder 208 extends/reconstructs the video signal separated by the demultiplexer 204.

The audio/video output unit 210 converts the video signal outputted from the video decoder 206 to a luminance and color signal to be displayable on a screen. And, the additional information processing unit 212 interprets the additional information signal separated by the demultiplexer 204.

The CAS module 214 extracts ECM (entitlement control message) PID and LTSID (local transport stream ID) from the information interpreted by the additional information processing unit 212.

And, the CAS module 214 assigns stream identifiers for discriminating multi-streams. In the present embodiment, the LTSID is used as the stream identifier. Since the LTSID is randomly assigned by the host 200, it can be used as the stream identifier according to the implementation of the host 200. In this case, since the LTSID needs to identify the multi-streams, it should be assigned not to be duplicated. And, new LTSID is assigned to a newly received stream if a channel is switched or if the host 200 is turned on or off.

A user-specific command signal is inputted to the user interface unit 216. For instance, there is a channel switching signal, an output type selecting signal, or the like.

The control unit 218 controls operations of the respective elements of the digital broadcast receiver. The control unit 218 includes the copy protection processing unit 219. The control unit 218 matches the CCI received from the cable card and the corresponding stream using the stream identifier and then establishes to store a table for the matched CCI and stream. If an output signal for a stream is selected, the control unit 218 controls an output of the stream using the CCI matched to the corresponding stream based on the table.

The storage unit 220 stores or provides the necessary information according to a control signal of the control unit 218. And, the table established by the control unit 218 is stored in the storage unit 220.

And, the cable card 250 is inserted in the card interface unit 222.

FIG. 3 is a detailed block diagram of a multi-stream copy protection apparatus of a host according to one general implementation.

Referring to FIG. 2 and FIG. 3, a exemplary host includes a CAS module unit 214 or 314 and a copy protection processing unit 219 or 319.

And, the copy protection processing unit 319 includes a certificate checking unit 320, a descrambling unit 321, and an output control unit 322.

The CAS module unit 314 assigns a stream identifier that may correspond to a multi-stream header. In this disclosure, the meaning of the stream identifier is identical to that of the stream header. In this case, the assigned stream identifier is given to a broadcast signal stream or a descramble key in the host.

The stream identifier is the information of prescribed bits to identify a corresponding stream. The stream identifier is not limited to special information but can include any identifier capable of identifying a corresponding stream. Preferably, LTSID is usable as the stream identifier. In the current open cable specifications, no limitation is put on a value of the LTSID assigned by the host. In this case, it is impossible to establish a table for connecting LTSID, stream, and other information together. So, a unique LTSID is basically assigned to each stream.

The CAS module unit 314 gives a stream identifier to an incoming broadcast signal stream tuned by the broadcast receiving unit. The broadcast signal stream having the stream identifier given thereto is transferred to the cable card. In doing so, the stream identifier can be inserted in a transmission message structure to be transferred. In this case, no limitation is put on the message structure. Preferably, the message structure employs a CAPMT message structure.

The certificate checking unit 320 performs mutual authentication in a manner of checking whether the corresponding host and cable card are valid. As a result of the mutual authentication, if both of the corresponding host and the cable card are valid, descrambling is executed. Yet, if the corresponding host and cable card are not valid, no further progress is made.

The descrambling unit 321 includes a key generator (not shown in the drawings) generating a descrambling key and a descrambler (not shown in the drawings) performing descrambling using the descrambling key.

When the key generator generates the descrambling key, the stream identifier assigned by the CAS module 314 is given to the descramble key. So, in descrambling a stream to which a prescribed stream identifier is assigned thereto, the descramble key having the same stream identifier of the stream assigned thereto is used.

And, the descrambler performs decoding in a manner of searching for a descramble key having the same stream header of the stream identifier of a signal stream as a target of the decoding.

After the descrambled broadcast signal has been displayed on a screen of the digital broadcast receiver, the output control unit 322 controls a use of the broadcast signal. In particular, in storing the corresponding broadcast signal in a hard disc or using the corresponding broadcast signal for a DVR, a time machine TV, or the like, the output control unit 322 discriminates the stream header of the used broadcast stream. For instance, if a stream-1 is store in a hard disc, if a stream-2 is displayed as a main picture, and if a stream-4 is displayed as a sub-picture, the output control unit 322 controls the respective functions to be implemented in a manner of discriminating the streams from each other using their stream headers. This is just the exemplary implementation.

Copy control is carried out in a manner of establishing a matching table between a CCI received from the cable card and a corresponding stream based on a stream identifier. In particular, CCI existing per stream is received, tablized, and then stored. In this case, since CCIs separately existing for the entire outputted streams are stored in the host, copy protection can be achieved without errors. For instance, a stream-1 is not restricted from being copied, a stream-2 can be copied once only, and a stream-3 is totally prevented from being copied. In this case, while the stream-1 is being displayed as a main picture, the stream-2 is selected to be displayed as a sub-picture and the stream-3 is selected to be recorded in a PVR. If so, the host selects the corresponding CCI according to an output selection of the stream to control the stream output.

FIG. 4 is a detailed block diagram of the multi-stream copy protection apparatus of the cable card according to one general implementation.

Referring to FIG. 4, a cable card 450 includes a receiving unit 451, a descrambling/scrambling unit 452, and a transmitting unit 453.

In particular, the receiving unit 451 receives a broadcast signal stream to which a stream identifier is given by a host. In this case, the stream identifier is included in a header of the corresponding stream. The receiving unit 451 reads and stores the stream identifier included in the header of the received stream. Meanwhile, a cable card gives the stored stream identifier to a scramble key and copy control information (CCI).

Details of the copy control information are shown in FIGS. 5 to 8 and will be explained later.

The copy control information contains an instruction for a copy control and is delivered to a host from a cable card.

If a copy control environment is changed in such a manner that a power of a display device is turned on, that a channel is switched, that information of a stream is changed in the same channel, or that significance of a stream is varied, the headend conveys the copy control information to the cable card. The cable card then conveys the received copy control information to the host.

FIG. 5 is a diagram of meanings of copy control information assigned to each bit.

Referring to FIG. 5, copy control information includes an 8-bit packet. In the following description, details of EMI, APS, and CIT of the individual bits are explained.

FIG. 6 is a diagram of copy permissions associated with EMI values.

Referring to FIG. 6, EMI is an abbreviation of Encryption Model Indicator. The EMI is responsible for a control of a digital output. If a value of the EMI is 00, copying is not restricted. If a value of the EMI is 01, 10, or 11, it means a case of conditional access. In particular, if a value of the EMI is 01, no further copying is permitted. If a value of the EMI is 10, one generation copy is permitted. If a value of the EMI is 11, copying is prohibited.

FIG. 7 is a diagram of definitions of APS values.

Referring to FIG. 7, APS is an abbreviation of Analog Protection system. The APS is responsible for an analog output control. If a value of the APS is 00, copy protection encoding is off. If a value of the APS is 01, AGC process is on but split burst is off. If a value of the APS is 10, AGC process is on and 2-line split burst is on. If a value of the APS is 11, AGC progress is on and 4-line split burst is on.

FIG. 8 is a diagram of definitions of CIT values.

Referring to FIG. 8, CIT is an abbreviation of Constrained Image Trigger. The CIT is used for image down-scaling for an analog output. If a value of the CIT is 0, no image constraint is asserted. If a value of the CIT is 1, image constraint is required.

The above-characterized copy control information (CCI) has the characteristics for the copy protection of the corresponding broadcast signal stream and needs to be correctly applied to the corresponding broadcast signal stream.

For this, the cable car gives a stream identifier to copy control information. In this case, the stream identifier given to the copy control information is the same stream identifier identical to the stream header of the broadcast signal stream according to the copy control information.

Meanwhile, the descrambling/scrambling unit 452 includes a key generator (not shown in the drawings) generating the scramble key and a scrambler (not shown in the drawings) executing scrambling using the scramble key. When the key generator generates the scramble key, the stream identifier received by the receiving unit 451 is assigned to the key. So, in scrambling a stream to which a prescribed stream identifier is given, a scramble key, to which a stream identifier identical to that of the scrambled stream is given, is used.

The scramble key performs scrambling in a manner of searching for a scramble key having a stream header identical to a stream identifier of a stream signal to be scrambled.

And, the transmitting unit 453 transmits the scrambled broadcast signal having the stream identifier given thereto and the copy control information to the host. In this case, the broadcast signal stream, the copy control information, and the stream identifier can be simultaneously or consecutively transmitted.

Thus, the configurations of the cable card and the host are separately explained in the above description. In the following description, mutual actions between the cable card and the host are explained with reference to FIGS. 2 to 4.

First of all, the CAS module unit 314 of the host assigns a stream identifier. The assigned stream identifier is given to a broadcast signal stream tuned by the broadcast receiving unit 202. The identifier-given stream is then conveyed to the cable card 250.

Meanwhile, the receiving unit 451 receives the broadcast signal stream, reads the stream identifier included in a header of the stream, and then stores the read stream identifier. The stored stream identifier is then given to copy control information. In this case, the stream identifier can be given to the copy control information by the receiving unit 451 or the descrambling/scrambling unit 452.

The descrambling unit 321 of the host and the descrambling/scrambling unit 452 of the cable card generate a descramble key and a scramble key to which the stream identifiers are given, respectively. In the cable card, a broadcast signal is scrambled using the scramble key having the same stream identifier of the broadcast signal stream and then transmitted to the host via the transmitting unit 453.

The host stores a plurality of CCIs per stream. And, the host matches the copy control information and the broadcast signal stream having the same stream identifiers, respectively. The examples of the matching are shown in FIG. 9. Hence, according to the corresponding copy control information, the broadcast signal stream is descrambled.

Figure 10:
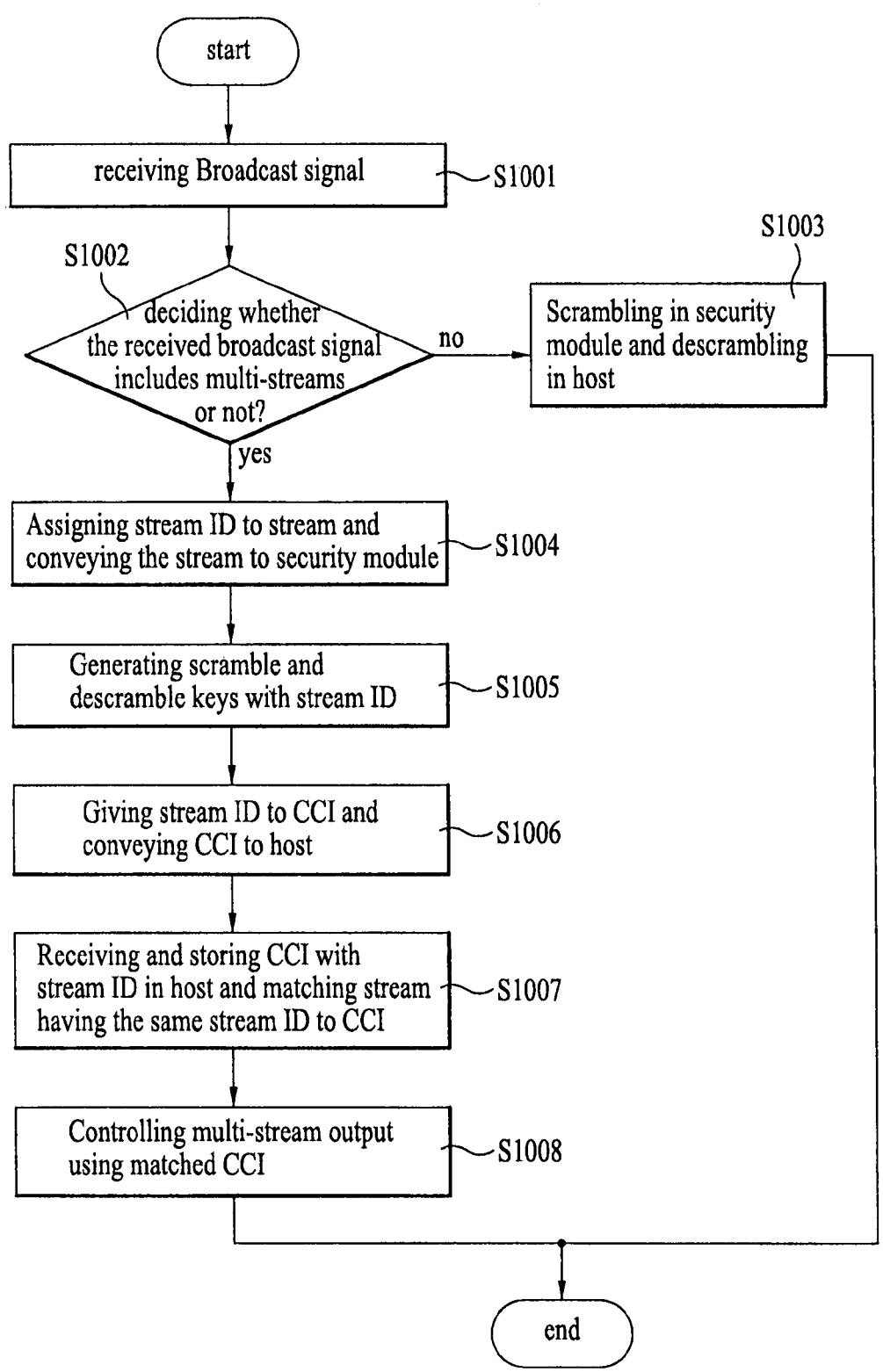
FIG. 10 is a flowchart of a method of multi-stream copy protection according to one general implementation.

FIG. 10 is a flowchart of a method of multi-stream copy protection according to one general implementation.

Referring to FIG. 10, a broadcast signal is received (S1001). It is then decided whether the received broadcast signal includes a single stream or multi-streams (S1002). If the received broadcast signal includes the single stream, scrambling and descrambling are carried out without further processing (S1003).

On the other hand, if the received broadcast signal includes the multi-streams, a separate process for giving a stream identifier to each stream is executed.

First of all, a stream identifier assigned by a host is given to a broadcast signal stream. The broadcast signal and the stream identifier are conveyed to a cable card (S1004).

The cable card having received the multi-stream signal reads and stores the identifier information for the received stream. The able card then generates a scramble key by giving the stored stream identifier to the scramble key. In doing so, the host generates a descramble key by giving the stream identifier to the descramble key (S1005).

The cable card then performs broadcast stream scrambling using the scramble key.

The table card gives the stored stream identifier information to copy control information (CCI) and then transfers the CCI to the host (S1006).

The host receives the CCI to which the stream identifier is assigned, establishes a table by matching the broadcast signal stream, the CCI, and the stream identifier together, and then stores the established table (S1007).

In one general implementation, the entire CCIs of the received multi-streams are stored in the host. If the CCI is changed for the same stream, a new CCI lately received is stored but the old CCI is deleted. If a new stream is received, a new table for the newly received stream is established and stored.

An output of the multi-stream is controlled using the matched CCI (S1008). In particular, a permission of copying differs per stream and each stream has CCI individually. So, by giving the same identifier, it is able to match a stream and CCI and perform errorless copy protection.

Besides, the contents of the explanation of the multi-stream copy protection apparatus are identically applied to the multi-stream copy protection method.

It will be apparent to those skilled in the art that various modifications and variations can be made in the implementations without departing from the spirit or scope of the above implementations. Thus, other implementations are within the scope of the following claims.

What is claimed is:

1. A method of processing copy protection in a host coupled to a cable card in a cable broadcast receiver, the method comprising the steps of:

receiving multi-streams conveying multiple simultaneous programs;

multiplexing the multi-streams by appending local stream identifiers to each stream of the received multi-streams, the local stream identifiers being generated by the host, wherein each of the local stream identifiers is a local transport stream identifier (LTSID) assigned by the host in order to identify each stream of the multiplexed multi-streams, and the LTSID is assigned to each of the multi-streams not to be duplicated;

transmitting the multiplexed multi-streams to the cable card;

receiving copy control information corresponding to the appended local stream identifiers for each stream of the transmitted multi-streams from the cable card; and controlling copy of each stream of the multi-streams based on the copy control information corresponding to each of the local stream identifiers, wherein the copy control information includes an encryption mode indicator indicating copy permissions for digital copy, an analog protection system indicating copy permissions for analog output, and a constrained image trigger indicating image constraint for analog component output.

2. The method of claim 1, further comprising:

generating a descramble key by giving a corresponding local stream identifier of the local stream identifiers; and descrambling a stream having the corresponding local stream identifier using the descramble key.

3. The method of claim 1, wherein in the step of controlling the copy of each of the multi-streams, the received copy control information is applied to each of multi-streams by real time.

4. A host coupled to a cable card in a cable broadcast receiver, which receives multi-streams, the host comprising:

a broadcast receiving unit configured to receive multi-streams conveying multiple simultaneous programs;

a processing unit configured to multiplex the multi-streams by appending local stream identifier to each stream of the received multi-streams, and transmit the multiplexed multi-streams to the cable card, the local stream identifiers being generated by the host, wherein each of the local stream identifiers is a local transport stream identifier (LTSID) assigned by the host in order to identify each stream of the multiplexed multi-streams, and the LTSID is assigned to each of the multi-streams not to be duplicated; and a control unit configured to receive copy control information corresponding to each of the appended local stream identifiers for each stream of the transmitted multi-streams from the cable card and control copy of each stream of the multi-streams based on the copy control information corresponding to each of the local stream identifiers, wherein the copy control information includes an encryption mode indicator indicating copy permissions for digital copy, an analog protection system indicating copy permissions for analog output, and a constrained image trigger indicating image constraint for analog component output.

5. The host of claim 4, further comprising a storage unit storing a table in which each of the local stream identifiers, each of the multi-streams and the copy control information are matched.

6. The host of claim 4, wherein if the value of the copy control information of the broadcast signal stream is changed, the control unit controls to store a value of most recently received copy control information matched to each of the local stream identifiers assigned to each of the multi-streams.

7. The host of claim 4, wherein the control unit controls copying of each of the multi-streams by applying the received copy control information to each of the multi-streams by real time.

8. The host of claim 4, further comprising:

a copy protection processing unit generating a descramble key by giving a corresponding stream identifier of the local stream identifiers, and descrambling a corresponding scrambled stream of the multi-streams using the descramble key.

9. A copy protection system receiving multi-streams, the copy protection system comprising:

a host configured to receive the multi-streams, the host multiplexing the multi-streams by appending local stream identifier to each stream of the received multi-streams, and transmitting the multiplexed multi-streams to a cable card, the local stream identifiers being generated by the host, wherein each of the local stream identifiers is a local transport stream identifier (LTSID) assigned by the host in order to identify each stream of the multiplexed multi-streams, and the LTSID is assigned to each of the multi-streams not to be duplicated; and the cable card configured to receive the multi-streams from the host, processing multiple simultaneous programs of the multi-streams, assigning copy control information corresponding to the appended local stream identifiers for each stream of the received multi-streams, and sending the copy control information to the host, wherein the host stores the copy control information and controls copy of each of the received multi-streams using the copy control information matched to each of the generated local stream identifiers, wherein the copy control information includes an encryption mode indicator indicating copy permissions for digital copy, an analog protection system indicating copy permissions for analog output, and a constrained image trigger indicating image constraint for analog component output.

10. The copy protection system of claim 9, wherein the host generates a descramble key by giving a corresponding local stream identifier of the local stream identifiers and wherein the cable card generates a scramble key by giving the corresponding local stream identifier to the scramble key.

11. The copy protection system of claim 10, wherein the cable card scrambles a corresponding stream using the scramble key matched with the corresponding local stream identifier and wherein the host descrambles the corresponding stream using the descramble key matched with the corresponding stream identifier.

12. The copy protection system of claim 9, wherein if a value of the copy control information is changed, copying of each of the multi-streams is controlled in a manner of storing a value of most recently received copy control information matched to the local stream identifier assigned to the stream and applying the copy control information to each of the streams by real time.

* * * * *